3,759,697
IRON ORE REDUCTION PROCESS

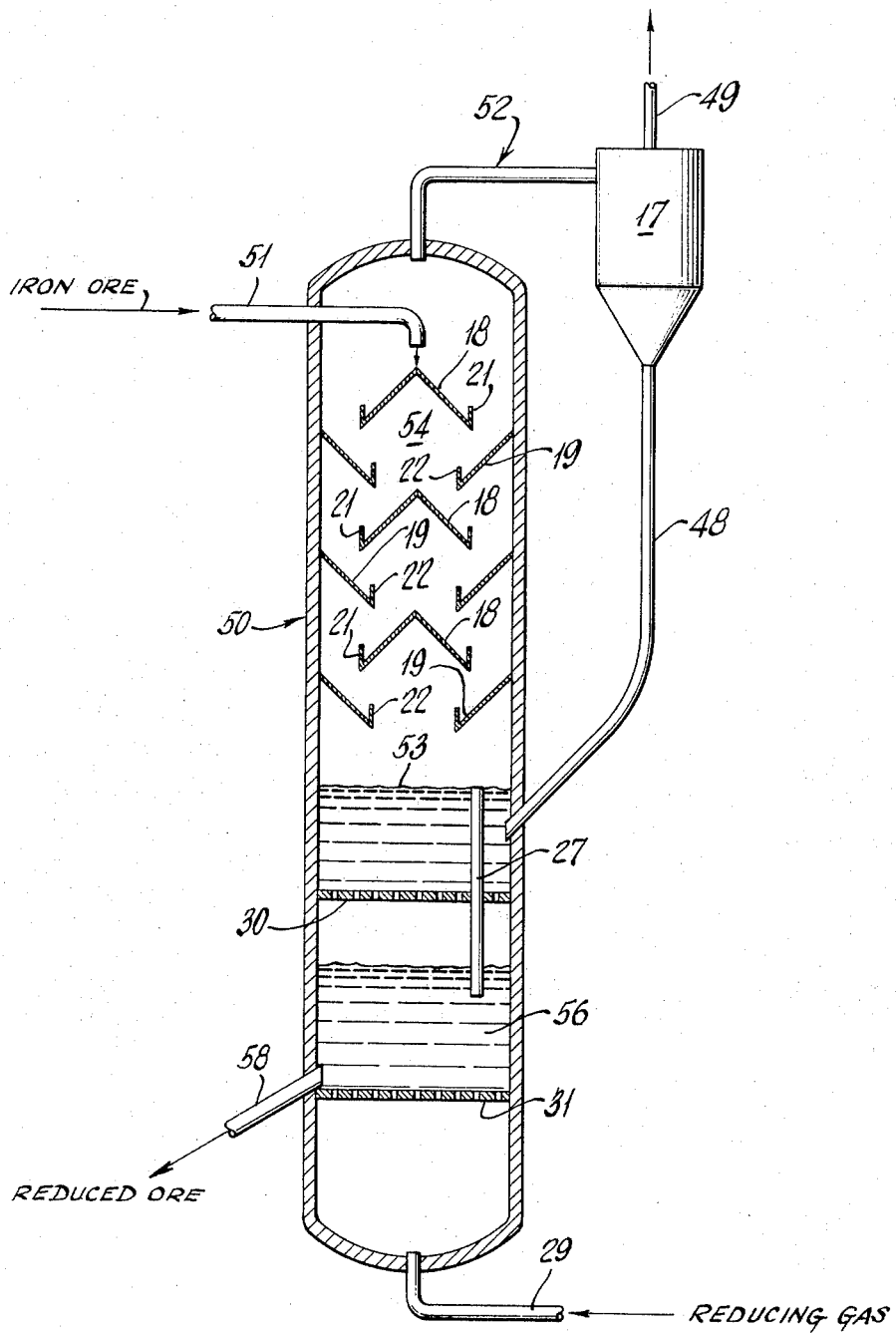

William J. Metrailer and Robert C. W. Welch, Baton Rouge, La., assignors to Esso Research and Engineering Company
Filed Sept. 30, 1970, Ser. No. 76,808
Int. Cl. C21b 13/14
U.S. Cl. 75—26                                           8 Claims

ABSTRACT OF THE DISCLOSURE

The direct reduction of iron ore is improved by passing the ore downwardly through an initial non-fluidized or hindered-fall reduction zone in countercurrent contact with reducing gas to partially reduce the ore to wustite. The wustite produced is immediately added to a ferrous reduction zone in which the ore is fluidized and reduced to a highly metallized material. The process eliminates the need for an ore preheater.

BACKGROUND OF THE INVENTION

There are a number of techniques known to the art for reducing metal oxides particularly iron oxides. For example, methods for producing metallic iron containing materials by the direct reduction of iron ores are known.

In direct reduction processes, particulate oxidic iron ore or iron oxides are reduced either by the interaction of the ore with solid carbonaceous reducing agents such as coal, coke or charcoal or by the interaction of the ore with various gaseous reducing agents such as carbon monoxide and/or hydrogen. Processes in which the iron ore or iron oxides are reduced by gaseous reducing agents are particularly pertinent to the present invention.

In processes utilizing gaseous reducing agents, an oxidic metal oxide or oxidic iron ore, for example, is passed through a rotary kiln or down the shaft of the furnace while in contact with the gas stream. Typically a sponge-like metallized product is obtained. In more advanced processes, the solid iron bearing material is fluidized in a stream of hot reducing gases and thereby reduced to powders or aggregates of metallic powders. Generally these powders are highly metallized, have a relatively high bulk density and uniform composition, and are of exceptionally high quality.

In fluid bed processes reduction of the ore is considered to proceed progressively through various oxidation states. For example, the iron oxide in the ore, i.e. ferric oxide, is considered as being reduced first to magnetite, then to wustite and finally to iron metal.

Commercially, the progressive fluidized reduction of the ore through various states of oxidation is performed in a series of discrete stages.

Typically, a preheated oxidic iron ore is fed into the initial or top stage of a fluid bed reactor where it is fludized and reduced by hot ascending reducing gas to wustite. Subsequently the wustite is discharged into the next lower stage where the ore is fluidized and reduced generally in a plurality of separate beds by ascending reducing gases to a highly metallized product. The ascending reducing gases which are introduced into the bottom of the reactor are progressively oxidized as the gases proceed through the various stages.

Of the various states of reduction through which the ore progresses in the production of a hghly metallized material, the reduction of wustite to iron is considered critical. It is, in any event, the rate controlling step. Consequently, whether a fluidized iron ore reduction process is conducted in a continuous or batchwise manner, the rate at which the wustite is reduced to metallic iron in the ferrous reduction zone sets the rate at which the wustite is fed into that zone. This, in turn, of course, results in holding the wustite in the initial ferric reduction zone under fluidizing conditions for times much longer than is necessary to reduce the oxidic ore to wustite.

In copending application S.N. 47,648 filed June 19, 1970, it is disclosed that with certain difficult-to-reduce ores, such as specular hematites, the overall reduction of the ore to metallic iron is enhanced by carrying out the reduction in the initial ferric reduction stage to a partially reduced ore, the oxygen content of which is just slightly greater than that for equilibrium wustite. That application is incorporated herein by reference.

The ability to terminate the reduction in the initial ferric reduction stage very shortly after introduction of the ore into that stage, such as is required in the above-mentioned copending application, is not easily achieved in fluidized bed processes. Proper fluidization of the ore in the wustite zone necessitates residence of the ore in the wustite zone for times in excess of that which are necessary to reduce the ore to equilibrium wustite compositions. Additionally, the final stage or ferrous reducing bed conditions prevent practical variation of time during which the ore is held in the initial fluidized reduction stage or stages.

As previously mentioned, excessively long fluidization of certain ores under initial stage reducing conditions is detrimental to the overall reduction process. In any event there are disadvantages in having final bed reducing conditions effectively limit initial bed reducing conditions. Moreover, fluidization and reduction of oxidic ores requires the utilization of complex equipment such as grid plates, downcomers and the like at relatively high capital investment with no apparent advantage, with most ore processed, in providing a higher quality product in greater yields. The present invention seeks to overcome these and other deficiencies of prior art fluidized reduction processes.

SUMMARY OF THE INVENTION

In accordance with the present invention the particulate oxidic iron ore is fed downwardly through a non-fluid initial reduction zone where it is partially reduced in countercurrent contact with a reducing gase. The partially reduced ore from the non-fluidized reduction zone subsequently is fed into a fluidized ferrous reduction zone where the ore is contacted with a reducing gas and progressively reduced to a highly metallized product.

By partial reduction of the ore in an initial non-fluidized reduction zone, gas utilization is enhanced through better staging and through countercurrent gas flow. Also, heat utilization is substantially improved and reactor design is greatly simplified since the number of fluidized beds is decreased. Moreover, difficult-to-reduce ores, such as specular hematite ores, are reduced with greater ease and efficiency through the disclosed process.

In the preferred embodiment of the present invention, a particular oxidic ore is continuously passed downwardly through the initial reduction stage in countercurrent contact with ascending reducing gas. Descent of the ore through the zone is controlled, in part, by baffles or other devices which hinder the fall of the ore through the zone so that the ore has a residence time in the zone sufficient to at least approach equilibrium wustite compositions. The wustite is then immediately fed to and reduced further in the first of a plurality of ferrous reduction beds.

BRIEF DESCRIPTION OF THE DRAWING

The figure is a diagram of a vessel for carrying out a reduction process according to this invention.

DETAILED DESCRIPTION OF THE INVENTION

The invention is described with reference to the figure wherein a single reactor is shown with two ferrous reduction beds. Optionally multiple reactors may be employed; but, in any event the practice of the present invention contemplates at least one fluidized bed in the final stage of a two stage process.

In accordance with the present invention a particulate oxidic iron ore is crushed, dried and sized for fluidization and reduction.

The ore which is used in this process may be any of the well known iron oxides containing ores including but not limited to limonite, specular hematite and earthy hematite. This process is particularly useful for the reduction of difficult to reduce iron ores such as specular hematites.

The drying, grinding and sizing of the ore is accomplished by any technique known in the art. For example, grinding can be achieved by subjecting the ore to ball milling, gyratory grinding, rod milling, or hammer milling. Sizing of the ore is accomplished generally by screening.

Drying the ore is accomplished generally by heating the ore to about 150° F. to about 350° F. Selection of proper time and temperature of drying the ore will depend upon the allowable water content of the ore. Generally after drying the ore will contain less than 4 wt. percent water and preferably less than 2 wt. percent water.

As stated previously, the ore is sized for fluidization in the reduction zone. Generally the finely divided ore has particles having an average size of about 100 microns to 400 microns or about 65 mesh. Preferably the average particle size is from 150 microns to 300 microns, and more preferably, from about 175 microns to 250 microns.

Referring to the figure, properly sized, dry particulate oxidic ore is delivered from the drier (not shown) to reactor 50 via line 51. The ore from the drier has a temperature of about 200° F.

Reactor 50 has a large upper chamber which contains baffles. These baffles comprise a series of discs 18 and doughnuts 19 provided with end weirs 21 and 22, respectively. The baffles in chamber 54 hinder the fall of ore through the chamber or initial reduction zone. Additionally, as the ore falls downwardly through chamber 54, spent reducing gas from dense fluidized bed 53 ascends and countercurrently contacts and reduces the falling ore. Thus, zone or chamber 54 is a non-fluidized or hindered-fall reduction zone.

The countercurrent flow of gas in the non-fluidized reduction zone cooperates with the baffles in chamber 54 so that the ore is contacted countercurrently with the ascending reducing gas only for a time sufficient to partially reduce the ore to a composition at least approaching equilibrium wustite. The partially reduced ore, i.e. the wustite, falls into the top ferrous reduction bed 53 where it is fluidized and further reduced.

Partially reduced iron ore from bed 53 is advanced through downcomer 27 to the final reduction bed 56. Fluidized beds 53 and 56 are shown supported on typical grids 30 and 31 respectively.

Generally the reduction in the initial reduction zone 54 is conducted at temperatures in the range of about 1000° F. to about 1600° F., and more preferably, at a temperature range between about 1100° F. to about 1400° F. Since the ore is reduced in zone 54 to magnetite and then to wustite in its downward passage, a temperature gradient can exist, in which event the temperature at the top of zone 54 may be as low as about 800° F. Thus a temperature gradient can be maintained in zone 54 ranging from 800° F. up to about 1600° F.

Reduction in the final or ferrous reduction stages is conducted at temperatures ranging from about 1200° F. to about 1600° F., and more preferably from about 1300° F. to about 1550° F. Even more preferred, temperature in the upper ferrous reduction bed is maintained in the range of 1325° F. to 1400° F. while the temperature in the lower ferrous reduction bed is maintained at 1450° F. to 1550° F.

In a preferred embodiment of the present invention, reducing gas is introduced by line 29 into fluidized bed 56 of reactor 50. The temperature at which the gas is introduced generally ranges from about 1500° F. to 1650° F. In general, the reducing gas is delivered into the reactor at pressures sufficient to maintain a proper flow of solids through the system. In general, this pressure is about atmospheric to about 200 p.s.i.g. However, the pressure may be varied while still achieving the desired reduction.

The reducing gas introduced into fluidized bed 56 has a high reducing power. For example, when a hydrogen rich reducing gas is used the mole ratio of $H_2O:H_2$ is about 0.02 to about 0.04, preferably the mole ratio of $H_2O:H_2$ is in the range of 0.02 to 0.03. When a CO containing reducing gas is employed, the ratio of $CO_2:CO$ generally is from about 0.1 to about 0.7 and more preferably from 0.3 to 0.6. Optionally, mixtures of hydrogen and CO containing gases may be used having ratios of $H_2O:H_2$ and $CO_2:CO$ within the above specified ranges.

As the reducing gas is sent through reactor 50 the ore is progressively reduced and the reducing gas is progressively oxidized. Thus the wustite emulsion gas or the reducing gas composition in zone 54, has an $H_2O:H_2$ ratio of about 0.40 to about 1.00, and preferably about 0.60 to 0.80.

If a CO reducing gas is employed the wustite emulsion gas has a $CO_2:CO$ ratio of about 0.60 to about 1.20, and preferably about 0.80 to 1.00.

Provision of the hindered fall stage of the reduction zone 54 eliminates the need for reactor grids and downcomers and similar complex processing equipment typically employed in fluidized bed reactors. The need to preheat the ore feed to initial reduction zone temperatures typically employed in fluid bed processes is eliminated. Instead ore is introduced directly from the drier to zone 54.

As stated previously, the rate of descent of the ore through the initial reduction zone 54 is sufficient to provide a partially reduced ore for introduction into the top of ferrous reduction bed 53, which ore has a composition at least approaching wustite. The holding time of the solids in zone 54 generally ranges from about 5 to about 240 seconds, preferably the holding time of the ore in this zone is from about 60 to 120 seconds. Maximum utilization of reducing gas is achieved in this zone since the ore is not only prereduced partially but also brought to the ferrous bed reducing temperatures.

Entrained solids exiting reactor 50 via line 52 are separated from the off gas in cyclone 17 and returned to the reactor via line 48. Line 48 introduces the recovered fines into the upper ferrous reduction bed 53. Optionally the fines can be discharged into the lower ferrous reduction bed 56.

Spent reducing gas exits via line 49 and can be used for a sensible heat recovery for drying and pretreating the ore feed. Alternatively, the $CO_2$ and/or $H_2O$ may be removed from the effluent gas stream and the remaining gaseous reducing constituents may be recycled to reactor 50.

Product removed via line 58 is highly metallized material ranging from about 80% to about 90% metallized. By metalization is meant the percent of iron in the reduced ore which is present as elemental iron.

To more fully explain the novel process disclosed herein, a specific example is given below. Reference is made in the example to the figure.

A hematite ore is continuously fed at a rate of 300 t./hr. (7129 lb. moles/hr. iron) to the top of the reduction reactor 50. The ore, so fed, is at a temperature of 250° F. The chemical composition of the ore is given in Table I.

TABLE I

| | Percent by wt. |
|---|---|
| Fe | 66.12 |
| $SiO_2$ | 2.08 |
| CaO | 0.01 |
| MgO | 0.01 |
| $Al_2O_3$ | 0.49 |

The Tyler screen sieve analysis of the ore is given in Table II below:

TABLE II

| Mesh size: | Wt. percent |
|---|---|
| +8 | 5.0 |
| +14 | 23.3 |
| +28 | 14.4 |
| +48 | 8.9 |
| +100 | 12.2 |
| +200 | 10.6 |
| +325 | 7.2 |
| Pan | 18.4 |

Downward progression of the ore through zone 54 is hindered by baffle members 18 and 19 so that the average residence time of the ore falling through the zone is 120 seconds. The ore passes downwardly through zone 54 in contact with ascending reducing gases. The ascending reducing gas is obtained from the top fluid bed 53 and has the composition shown in Table III.

TABLE III

| Compound: | Mole percent |
|---|---|
| $H_2$ | 49.1 |
| CO | 8.5 |
| $H_2O$ | 16.5 |
| $CO_2$ | 3.7 |
| $CH_4$ | 16.1 |
| $N_2$ | 6.1 |

The ore which exits zone 54 and is fed immediately into top ferrous reduction bed 53 is at 1326° F. and has the composition, FeO 1.1.

In top ferrous fluidized reduction bed 53 the ore is fluidized and reduced at a temperature of 1376° F. with reducing gas from the preceding reduction zone 56. The reducing gas is at a temperature of 1474° F. and is fed into top ferrous reduction bed 53 at a rate of 58,633 lb. moles per hour. In Table IV the composition of the reducing gas introduced into the bottom of bed 53 is presented.

TABLE IV

| Compound | Mole percent |
|---|---|
| $H_2$ | 55.5 |
| CO | 9.0 |
| $H_2O$ | 7.7 |
| $CO_2$ | 1.3 |
| $CH_4$ | 15.1 |
| $N_2$ | 11.4 |

The ore reduced in bed 53 is advanced via downcomer 27 to the next lower fluidized reduction bed 56. The composition of the partially reduced ore introduced into the lower reduction bed 56 is $FeO_{0.2983}$.

In the final reduction bed 56, the reducing gas is introduced via line 29 at a temperature of 1540° F. and at a rate of 58,616 lb. moles per hour. The composition of the gas introduced via line 29 is given in Table V below.

TABLE V

| Compound: | Mole percent |
|---|---|
| $H_2$ | 61.6 |
| CO | 7.1 |
| $H_2O$ | 1.5 |
| $CO_2$ | 3.8 |
| $CH_4$ | 14.8 |
| $N_2$ | 11.2 |

A highly metallized product having the composition $FeO_{0.074}$ is recovered via line 58 at a rate of 6,879 lb. moles per hour of total iron.

What is claimed is:

1. In the direct reduction of particulate oxidic iron ores wherein the ore is progressively reduced in a series of fluid bed reduction zones by reducing gases ascending upwardly through each of the successive reducing zones the improvement in combination therewith comprising:
    passing an iron ore downwardly through a plurality of baffles defining an initial hindered-fall, non-fluidized bed reduction zone in countercurrent contact with an ascending reducing gas whereby said ore is partially reduced; and
    fluidizing and reducing said partially reduced ore with reducing gas in at least two fluidized beds in a ferrous reduction zone whereby a reduced ore of high metallization is produced.

2. The process of claim 1 wherein the ore is passed downwardly through said initial hindered-fall non-fluidized bed reduction zone at a rate sufficient to partially reduce the ore to a composition at least approaching wustite.

3. The process of claim 2 wherein said rate provides contact between said ore and reducing gas of from about 5 to about 240 seconds.

4. The process of claim 1 wherein said initial zone is maintained at from about 1000° F. to about 1600° F. and said ferrous reduction zones are maintained at about 1200° F. to about 1600° F.

5. The process of claim 1 wherein said ore is a specular hematite.

6. A process for direct reduction of iron ore wherein the ore is progressively reduced in a series of reduction zones by ascending reducing gases comprising:
    continuously feeding a particulate oxidic iron ore through a plurality of baffles defining an initial hindered-fall non-fluidized bed reduction zone;
    countercurrently contacting said ore with reducing gases;
    maintaining said ore in countercurrent contact with said reducing gas for a time just sufficient to partially reduce said ore to wustite;
    continuously discharging said wustite into a ferrous reduction zone; and
    fluidizing and reducing said wustite in said ferrous reduction zone with ascending reducing gases to a highly metallized iron material.

7. The process of claim 6 wherein said ore is maintained in countercurrent contact with said reducing gas in said initial zone at temperatures ranging from about 1000° F. to about 1600° F. and wherein said wustite is fluidized and reduced in said ferrous reduction zone at about 1200° F. to about 1600° F.

8. The process of claim 6 wherein said ore is fed downwardly through said hindered-fall non-fluidized bed reduction zone at a rate whereby said ore is contacted by said reducing gas for about 5 to about 240 seconds.

References Cited

UNITED STATES PATENTS

| 2,921,848 | 1/1960 | Agarwal | 75—26 |
| 3,479,232 | 11/1969 | Broussard | 75—34 |

(Other references on following page)

UNITED STATES PATENTS

| | | | |
|---|---|---|---|
| 3,317,308 | 5/1967 | Greffe | 75—34 |
| 3,364,010 | 1/1968 | Mayer | 75—26 |
| 3,511,642 | 5/1970 | Etherington | 75—26 |
| 3,374,087 | 3/1968 | Gray | 75—26 |
| 2,978,315 | 4/1961 | Schenck et al. | 75—10 R |
| 2,538,201 | 1/1951 | Kalbach et al. | 75—26 |
| 2,638,414 | 5/1953 | Lewis | 75—26 |
| 2,711,368 | 6/1955 | Lewis | 75—26 |
| 3,227,546 | 1/1966 | Johnson et al. | 75—26 |

FOREIGN PATENTS

| | | | |
|---|---|---|---|
| 980,426 | 1/1965 | Great Britain | 75—26 |

L. DEWAYNE RUTLEDGE, Primary Examiner

MELVIN J. ANDREWS, Assistant Examiner

U.S. Cl. X.R.

75—34